Figure 1A:
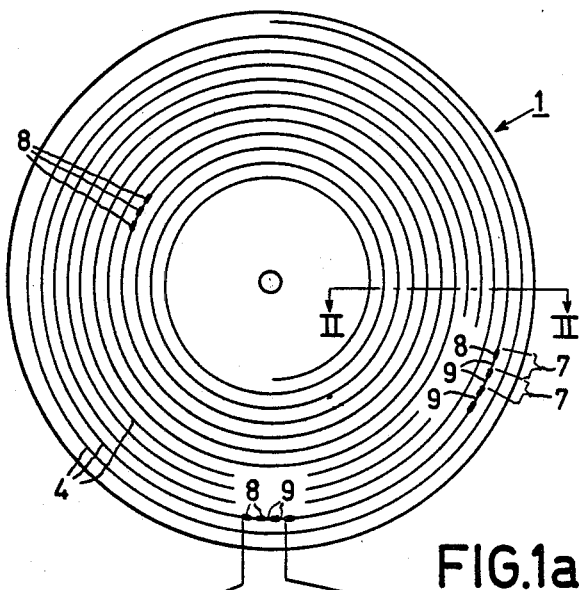

United States Patent [19]

Getreuer

[11] Patent Number: 4,807,211
[45] Date of Patent: Feb. 21, 1989

[54] APPARATUS FOR INSCRIBING AND/OR READING A RECORD CARRIER

[75] Inventor: Kurt W. Getreuer, Eindhoven, Netherlands

[73] Assignee: U.S. Philips Corporation, New York, N.Y.

[21] Appl. No.: 382,737

[22] Filed: May 27, 1982

[30] Foreign Application Priority Data

May 29, 1981 [NL] Netherlands .................. 8102621

[51] Int. Cl.⁴ ............................................. G11B 7/095
[52] U.S. Cl. ...................................... 369/44; 250/202
[58] Field of Search ................... 369/44, 59, 50, 60, 369/48, 124; 250/202

[56] References Cited

U.S. PATENT DOCUMENTS

| | | | |
|---|---|---|---|
| 4,366,564 | 12/1982 | Haan | 369/124 |
| 4,375,088 | 2/1983 | Haan | 369/44 |
| 4,397,010 | 8/1983 | Nabeshima | 369/44 |
| 4,464,714 | 8/1984 | Huijsey | 364/200 |

*Primary Examiner*—Alan Faber
*Attorney, Agent, or Firm*—Algy Tamoshunas

[57] ABSTRACT

An apparatus for recording and/or reproducing information on an optically inscribable and readable disc-shaped record carrier with a previously formed track pattern containing a first track modulation, in order to obtain a clock signal, and a second track modulation formed by a radial wobble, in order to obtain a tracking signal. A reference signal for generating a tracking signal via synchronous detection is derived from the clock signal by frequency synthesis.

8 Claims, 4 Drawing Sheets

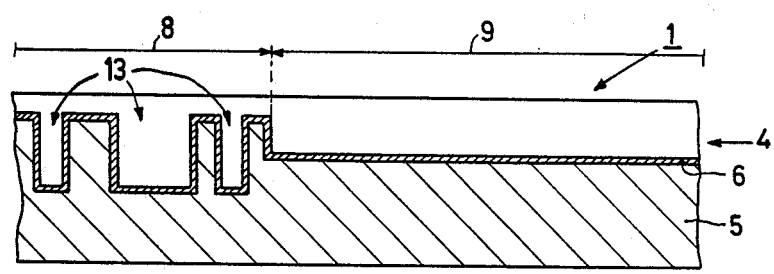
2a PRIOR ART
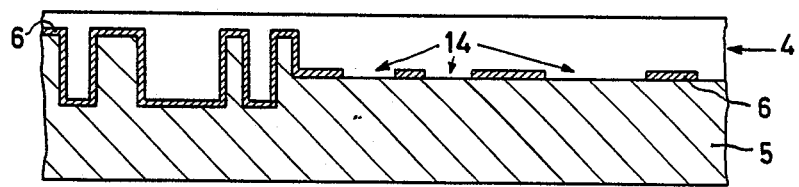
2b PRIOR ART
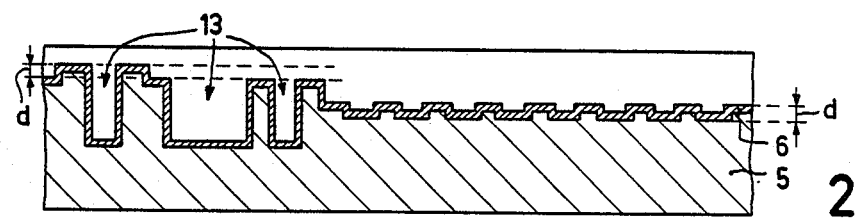
2c PRIOR ART
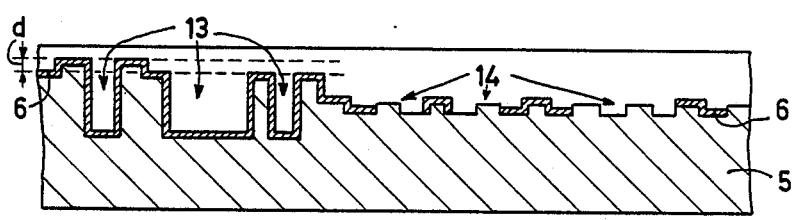
2d PRIOR ART
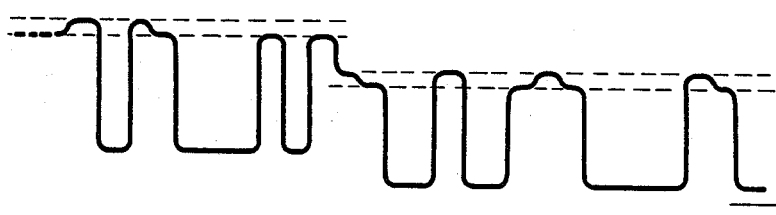
2e PRIOR ART
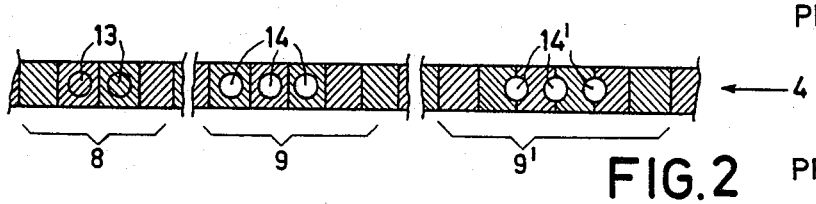
FIG. 2 2f PRIOR ART

APPARATUS FOR INSCRIBING AND/OR READING A RECORD CARRIER

The invention relates to an apparatus for inscribing and/or reading a record carrier, which record carrier comprises a disc-shaped substrate having a radiation-sensitive information layer and is provided with information areas arranged in accordance with a spiral or concentric track pattern. The record carrier is intended for recording and/or reproducing digitally coded information of a fixed bit frequency in the information areas via a radiation beams. The information areas have an optically detectable first periodic track modulation, whose period corresponds to a frequency for which the power spectrum of the digitally coded information to be recorded or recorded at least substantially exhibits a zero point, for generating a clock signal of bit frequency during recording and/or reproduction. Superimposed on the first periodic track modulation is a second periodic track modulation, the track position being modulated in a radial direction, for generating a radial tracking signal during recording and/or reproduction. The apparatus for this purpose comprises an optical system for projecting a light beam on said information areas, a detector for detecting readiation which has been reflected or transmitted by the recording areas, and a read circuit for extracting a read-out information signal from the detected radiation. The period of the first periodic track modulation on said record carrier at the tangential scanning speed of the record carrier corresponds to a first signal frequency, the period of the second periodic track modulation at said specific tangential speed of the record carrier corresponds to a second signal frequency, with the frequency difference between the first and the second signal frequency being constant.

Previous Netherlands Patent Applications No. 8000121, corresponding to U.S. application Ser. No. 134,392 filed Mar. 20, 1980, and No. 8,000,122, corresponding to U.S. Pat. No. 4,375,088, describe a similar apparatus, the use of said first period of the track modulation being proposed in order to obtain a clock signal. For the generation of a radial tracking signal said Applications propose the use of filters and phase-locked loops in order to obtain the clock signal and a signal of a frequency corresponding to the period of the second periodic track modulation, which last-mentioned signal is derived from the difference between the signals originating from parts of the detector disposed on both sides of a dividing line which extends in the track direction, the two signals being employed in order to obtain a tracking signal through synchronous detection. It has been found that the method proposed in said previous Application only preforms satisfactorily when the track is followed correctly and not when a track change takes place. In accordance with a recognition underlying the invention this is because components in said difference signal, which components are caused by said second periodic track modulation, consecutively exhibit two oppositely directed phase jumps in the case of a track change, so that said components are not suitable for generating a reference signal for synchronous detection by means of a phase-locked loop.

It is an object of the invention to provide an apparatus of the type mentioned in the opening paragraph, which apparatus generates a reliable tracking signal during a track change in accordance with the invention, the apparatus is characterized by a first band-pass filter for signals of the first frequency, in order to obtain a clock signal which is applied to the read circuit for synchronizing the read-out of said digital information, a second band-pass filter tuned to a second frequency corresponding to the frequency of a signal produced by the second periodic track modulation, a frequency synthesizing circuit synchronized by the clock signal, for generating a signal of a frequency equal to said second frequency, and a synchronous detection circuit for mixing the signal passed by the second band-pass filter with the signal generated by the frequency synthesizing circuit, in order to obtain a radial tracking signal. Said apparatus may further be characterized in that there is provided a synchronizing circuit controlled by the read circuit, for synchronizing the frequency synthesizing circuit with the information read from the synchronization areas of the record carrier in order to ensure a correct phase relationship between the synthesized signal and the signal passed by the second band-pass filter, or alternatively, in that there is provided a controllable phase shifter for correcting the phase relationship between the synthesized signal and the signal passed by the second bandpass filter.

Figure 3:
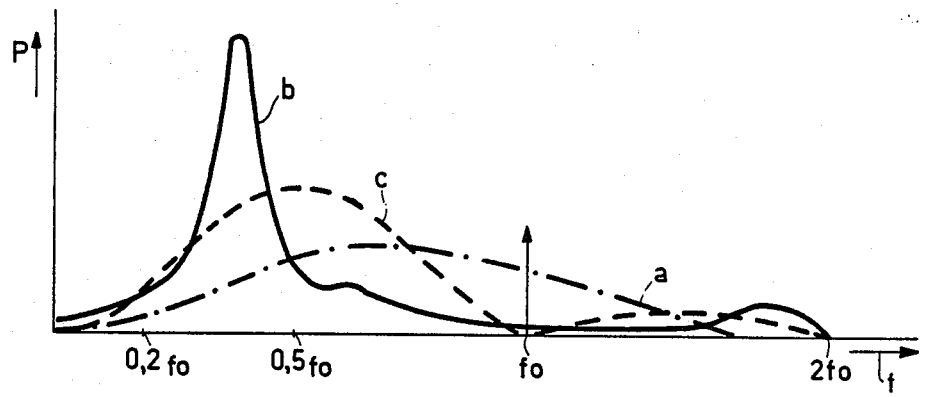
Figure 4A:
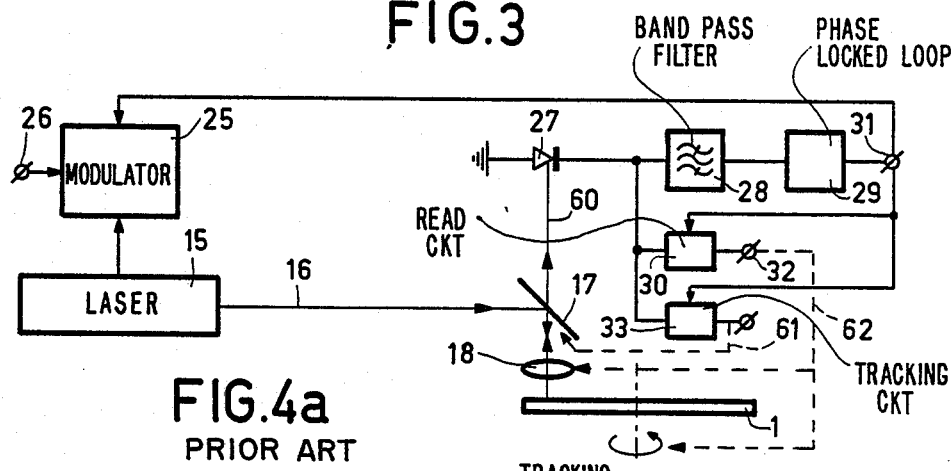
Figure 4B:
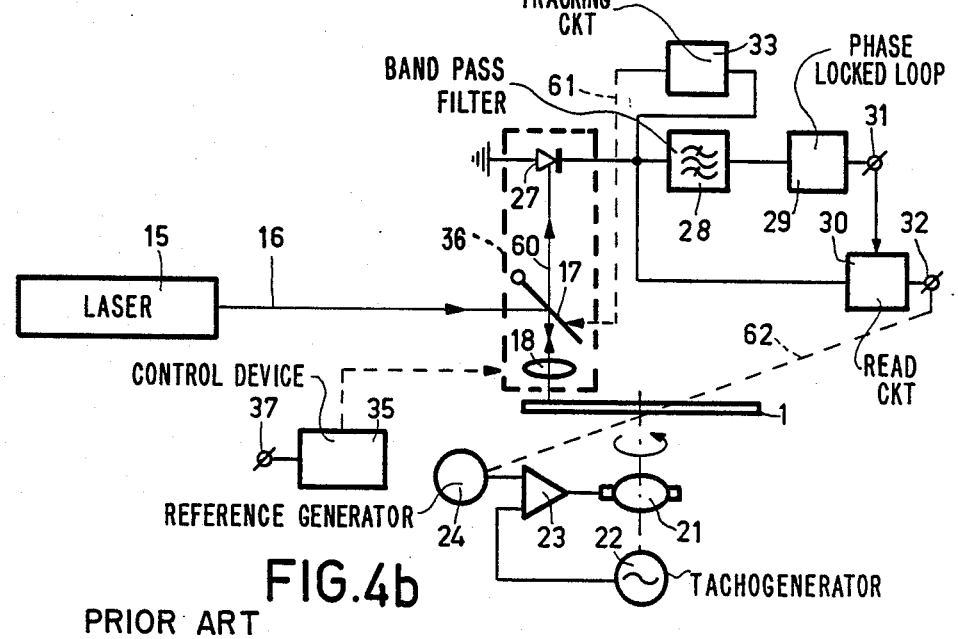
Figure 5:
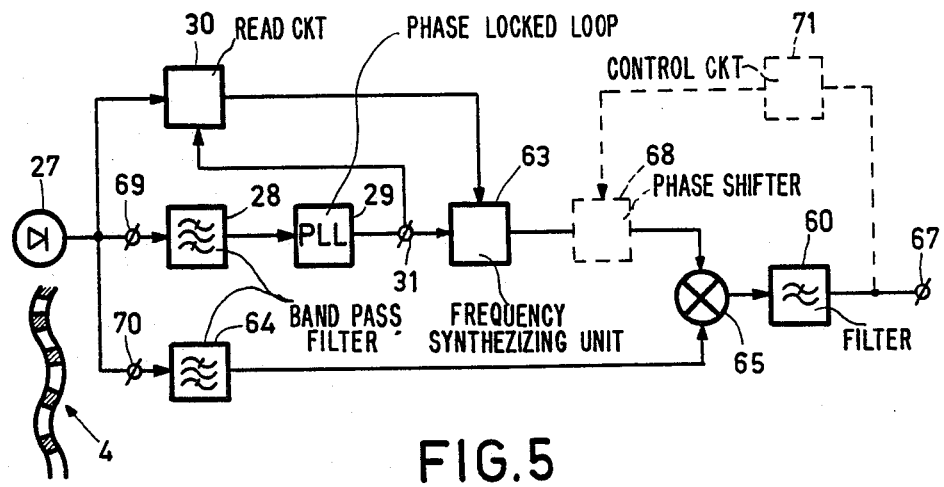
Figure 6:
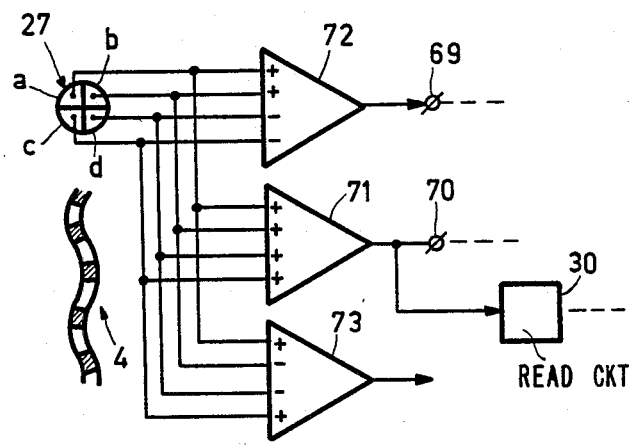

The invention will now be described in more detail with reference to the drawing, in which FIGS. 1a and 1b and 1c, by way of illustration show an embodiment of a record carrier for use in an apparatus in accordance with the invention, FIGS. 2a through 2f are section views of such a record carrier in the longitudinal direction of the tracks during a number of stages in the manufacture of such a record carrier, FIG. 3 represents the random power spectra of the three possible binary information-signal modulations, FIG. 4a represents an apparauts for recording information on such a record carrier, FIG. 4b shows an apparatus for reading such a record carrier, FIG. 5 shows an example of a tracking circuit for use in an apparatus in accordance with the invention, and FIG. 6 represents a modification of a part of the circuit shown in FIG. 5.

Figure 1B:
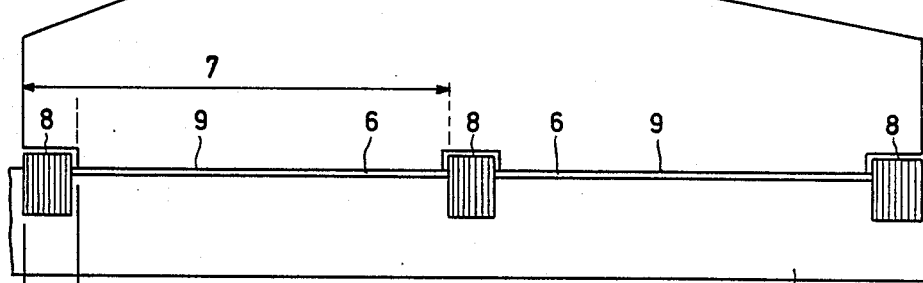
Figure 1C:
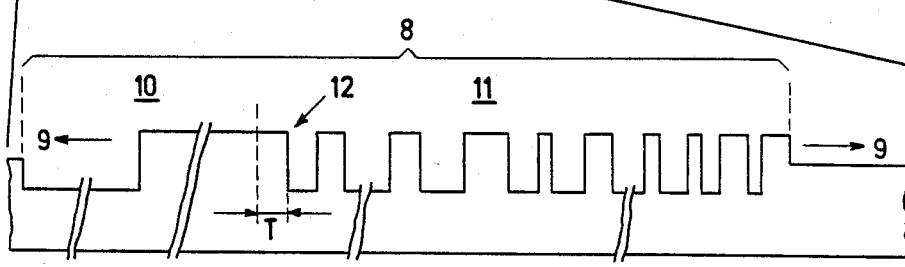

FIG. 1 by way of illustration represents an embodiment of a record carrier as described in the said previous Patent Application, to which the principle in accordance with the invention may be applied, FIG. 1a being a plan view of said record carrier, FIG. 1b showing a part of a track 4 of said record carrier on an enlarged scale, and FIG. 1c representing a synchronization area of said part on an enlarged scale. The record carrier body 1 is formed with a spiral track 4. Said track 4 is divided into a multitude of sectors 7, for example 128 per revolution. Each sector 7 comprises an information area 9, intended for recording digitally coded information, and a synchronization area 8. Such a synchronization area 8 comprises two portions, namely an indicator portion 10 and an address portion 11. The address portion 11 contains all the information required for controlling the write process.

In order to ensure that the digital information is recorded in an accurately defined path, the track 4 serves as a servotrack. The servo tracks 4, specifically in the information tracks 9, are formed as grooves in the substrate 5, so that a radiation beam, which is directed at the record carrier in order to record digital information, can be made to coincide accurately with said servotrack 4. In other words, the position of the radiation beam can be controlled in a radial direction via a servo system which empoloys the light reflected by the record carrier.

In order to enable digital information to be recorded, the record carrier body is provided with a layer of a material 6, which is exposed to suitable radiation is subject to an optically detectable change, so that when an information track thus recorded is scanned by means of a read beam of radiation the reflected radiation beam is amplitude-modulated in accordance with the recorded information.

As is apparent from the foregoing, the record carriers intended for the user and not yet containing information in the information areas comprise a groove structure in said information areas within a sectors. Moreover, such a record carrier contains a synchronization areas 8 formed by an optically detectable relief structure within each sector. FIG. 1b represents a part of a track 4 on an enlarged scale, illustrating the sequence of a number of information areas 9 and synchronization areas 8. The synchronization areas 8 are constituted by a relief structure comprising a sequence of recesses alternating with intermediate or lands.

FIG. 2, in FIGS. 2a to 2d, schematically represents a sectional view of a part of such a servo track 4 in the longitudinal direction of the servo tracks 4 showing a portion of the synchronization area 8 and a portion of the information area 9, FIG. 2a being such a sectional view of a blank premanufactured disc using prior-art technology, FIG. 2b representing such a sectional view after digital information 14 has been recorded in the information area 9, FIG. 2c representing such a sectional view of a blank premanufactured disc provided with clock information in accordance with the said previous Patent Application, and FIG. 2d representing the sectional view of FIG. 2c after information 14 has been recorded in the information area 9. FIG. 2e schematically represents the signal obtained when reading the portion of the track 4 shown in sectional view in FIG. 2d and FIG. 2f schematically represents a plan view of a part of a track 4 after information has been recorded in a manner other than shown in FIGS. 2b and 2d.

The premanufactured disc is formed with a servo groove 4, formed in a substrate 5 by means of, for example, a laser beam. The synchronization area 8 may then be provided with an information-representing relief structure with "pits" 13 by modulating the intensity of the laser beam. Subsequently, the entire structure as well as the part of the record carrier 1 outside the grooves 4 may be coated with the reflecting information layer. In this premanufactured record carrier information can be recorded in the information area 9 by forming holes 14 in the reflecting information layer, for example by means of a laser beam. Such an inscribed record carrier is shown in FIG. 2b. During the recorded of information, that is, when the pits are formed, and during reading of said information, for example by means of a laser beam, it is essential tha the process of recording or reading said information is synchronized by means of a clock signal, which information may be contained in the synchronization areas 8. In order to ensure that a suitable synchronous clock signal is available throughout the write and read operations, that is, during inscribing and reading of the information areas 9, the servo groove 4, as is described in the said previous Application, is provided with a structure which produces a modulation of the light reflected by the information carrier when the servotrack 4 is being followed during reading or recording.

However, said structure should be such that it does not affect the information reading process. This is illustrated by means of FIG. 3 which shows the random power spectra of three possible binary information-signal modulations as described in said previous Application.

The reference character a represents a modulation known as "biphase" modulation, the reference character b a modulation known as "Miller modulation" and the reference character c a modulation known as "quadphase modulation".

From FIG. 3 it is evident that these modulation techniques have the common property that the resulting binary signal does not contain strong frequency components at comparatively low frequencies, for example frequencies lower than 0.2 fo. FIG. 3 further shows that at the frequency 2 fo and when modulation method c is used zero points are also obtained in the spectrum at the frequency fo. This means that it is possible to provide the record carrier with a clock structure having a frequency 2 fo without said frequency interfering with the information signal. Zero points at the frequency 2 fo also occur in the case of other modulation methods. When quadphase modulation (modulation c) is used and also in the case of some other modulation methods—such as the modulation method described in the non-prepublished Patent Application No. 8006165, corresponding to U.S. application Ser. No. 315,793 filed Oct. 28, 1981,—the frequency fo is very suitable for this purpose, which frequency corresponds to the bit frequency 1/T, which renders this quadphase modulation very attractive. In the case of modulation method bit it is also possible in some caes to provide a structure of the frequency fo, because the components of the spectrum of modulation b at said frequency are comparatively small. Furthermore, it is theoretically possible to provide the structure with a modulation corresponding to a frequency higher than 2 fo, but in practice this is generally not feasible. Indeed, in view of a maximum information density, the dimensions of the pits 13 and 14, which at a specific speed of rotation of the disc 1 at least correspond to a bit period of ½ T, should be selected as closely as possible to the resolution of the write/read system used, so that a surface structure corresponding to frequencies higher than 2 fo will hardly be detectable. Furthermore, it is also possible to obtain zero points in the power spectra at frequencies other than fo or 2 fo, for example at ½ fo, using special modulation techniques.

FIG. 2c shows a sectional view of a record carrier in accordance with the invention, corresponding to the sectional view of FIG. 2a, whose surface at least at the location of the track 4 has a relief structure of a height d. One possibility of achieving this is to modulate the laser by means of which the synchronization area 8 and the groove 4 of the information area 9 are formed. In the present example this has only been done in the synchronization area 8 between the pits 13 by limiting the intensity of the laser beam. However, in principle it is alternativley possible to provide the bottom of the pits with a relief structure. As is shown in FIG. 2d the disc in accordance with the invention may alternatively inscribed with information by forming holes 14 in the reflecting layer 6 covering the relief structure. FIG. 2e shows an example of a signal obtained when reading a relief structure in accordance with FIG. 2d. Said signal exhibits minima at the location of the pits or the holes 13 and 14 and an amplitude modulaton corresponding to the modulation structure (d in FIG. 2c) with a frequency fo at the maximum. The modulation structure at the bottom of the holes 14 hardly contribute to the signal, because it hardly reflects any light owing to the removal of the reflecting layer 6. In this respect it is to be noted that it is alternatively possible to provide, for example, a non-reflecting layer 6, which is locally removed, on a relfecting substrate 5. As a result of this, the modulation of the frequency fo will be read effectively at the very locations 14 where the non-reflecting layer has been removed.

In FIGS. 2a–2d, the pits 13 or holes 14 are represented as holes or pits which are continuous, that is in the case of more than one bit as an elongate groove with a length corresponding to the number of consecutive bits. However, it is alternatively possible to form a separate pit or hle for each bit. This is illustrated in FIG. 2f, which shows a track 4, in which the clock modulation structure is represented by differently hatched portions. In the synchronization area 8 the pits 13 may then for example be formed in the centres of the maxima or minima of the structure and they are also coated with the reflecting layer 6, which is symbolized by the continuous hatching of said pits 13. In the information section 8 the information holes 14 may be formed in the reflecting layer 6 at the maxima and minima of the clock information structure. Alternatively, it is possible, as is represented by the information area 9 in FIG. 2f, to position holes 14 at the zero points of the information structure. In this respect the location of the pits 13 or holes 14 is not essential, provided that the phase relationship with the clock information structure is fixed and known. Neither is the shape of the information structure of great significance. Instead of the castellated shape shown in FIG. 2 it may have a sinusoidal shape, which is very well possible when the structure is formed by means of a modulated laser beam. It is merely of importance that said clock synchronization structure exhibits a readily detectable frequency component at the frequency fo or 2 fo and contains no strong components within the spectrum of the synchronization or digital-information signal recorded or to be recorded, which in general is the case when the clock information structure d has a fundamental frequency fo or 2 fo with only higher-order harmonics, the next harmonic then being 2 fo or 4 fo, which as is shown in FIG. 3 falls beyond the part of the information spectrum is of interest.

In order to illustrate how the structures in accordance with FIG. 2 are obtained FIG. 4 schematically represents an apparatus for recording information in the record carrier of FIG. 2c in FIG. 4a and an apparatus for reading such an inscribed record carrier in FIG. 4b.

FIG. 4a schematically represents an apparatus for providing the premanufactured disc 6 with information whilst simultaneously reading the clock modulation structure. Said apparatus comprises a rotary disc 1 and a laser 15, whose beam 16 is projected onto the disc 1 via a semitransparent mirror 17 and an optical focussing system 18. A reflected beam 60 is detected by means of a cell 27, for example a photodiode, and is converted into an electric signal from which the band-pass filter 28 extracts the component of the frequency fo (or 2 fo) which is produced by the clock modulation structure which is mainly located in the track 4. If desired, said signal may be applied to a phase-locked loop 29, which improves filtering, increases the constancy of the clock signal, and compensates for brief signal drop-outs. The clock signal then appears on output 31. Data information can be recorded by a pulse-wise modulation of the laser beam 16, by arranging a modulator directly in the beam, or as is shownin FIG. 4a, by modulating the laser 15 itself with the aid of a write modulator circuit 25, which receives the information via input 26 and which is synchronized by the clock signal on output 31.

Via the light-sensitive element 27 and a read circuit 30, the information contained in the synchronization sections is extracted from the reflected beam 60, which information is available on an output 32. The read circuit 30 may also be synchronized by the clock signal on output 31. The information may be employed for synchronizing the circuit 25 and for locating the correct position on the disc. Furthermore, the information is employed in a servo control, not shown in FIG. 4a, for radially positioning the optical system 18 and the mirror 17 in order to inscribe the desired portion of the track 4, and for controlling the drive of the disc 1, which is symbolically represented by the broken line 62 in FIG. 4a.

Furthermore the apparatus is equipped with a tracking circuit 33, which derives a tracking signal from the signal supplied by the detector 27, for keeping the beam 16 directed at the track 4 by controlling the angle of the mirror 17 relative to the beam 16, which is symbolically represented by the line 61 in FIG. 4a.

FIG. 4b shows an apparatus for reading an inscribed disc 1, which appararatus will generally be combined with that of FIG. 4a in practice. The apparatus again comprises a laser 15 whose beam 16 is projected onto the disc 1 via a mirror 17 and an optical system 18. By means of the photodiode 27 the reflected beam 60 is detected and the resulting electric signal is passed through a band-pass filter 28 having a band-pass frequency fo and a phase-locked loop 29 tuned to the frequency fo, so that the clock signal of the frequency fo (or 2 fo) is available on output 31. The information recorded in the disc is decoded from the electric signal supplied by the photodiode 27 by means of the read circuit 33, so that on an output 34 thereof the digital information and the information contained in the synchronization areas 8 is available. The read circuit is synchronized with the clock signal on output 31. In addition, a tracking signal may be derived from the beam detected by the photodiode 27 by means of a tracking circuit 33 in order to control the mirror 17 in such a way that the beam 16 exactly follows the track 14. The disc drive motor 21 may be included in a servo system, for example comprising a tachogenerator 22, a reference source 24 and a servo amplifier 23, in order to control the speed, which control system may be coupled to the read circuit 30. Furthermore, the apparatus comprises a control mechanism 35 for radially moving the optical system 18 together with the mirror 17 and the detector 27—which are together designated 36 in FIG. 6c—so that at option a specific portion of the disc can be read under control of information applied to an input 37 of the control mechanism 35 and of the information produced by the synchronization areas and appearing on output 32 of the read circuit 30.

A tracking signal can be obtained by giving the track 4 a radial wobble with an angular frequency $w_w$ at the nominal speed of the disc, so that the signal supplied by said detector 27 contains components of the angular frequency $w_w$ and of the angular frequency $\Delta w = w_c - w_w$, which is the difference between the angular frequency $w_c$ of the signal corresponding to the clock synchronization structure and the angular frequency $w_w$ of the signal corresponding to the radial wobble, which components have an amplitude which is a function of the distance to the centre line of the track 4. In accordance with the said previous Patent Application No. 8000121, corresponding to U.S. application Ser. No. 134,392, it is possible to recover a tracking signal therefrom by synchronous detection with a signal of an angular frequency $w_w$ or $\Delta_w$, said signals being derived from the signal detected by the photodiode 27. However, it is found that this method is satisfactory only when the track is followed correctly. In the case of excursions to other tracks, as occur during the location of a specific track, said method appears to be unsatisfactory, because in the case of a track change phase jumps occur in said recovered signals of an angular frequency $w_w$ or $\Delta_w$. In accordance with the inventoin this may be precluded by selecting the frequency of the tracking wobble in synchronism with the frequency of the clock-information structure and, for generating a tracking signal, by synthesizing said frequency $w_w$ of the tracking wobble or said difference frequency $\Delta_w$ from the frequency of the clock information structure, in which said phase jumps do not occur because this is a tangentially varying structure.

FIG. 5 shows an example of a tracking circuit (33 in FIGS. 4a and 4b) for use in an apparatus in accordance with the invention. By means of the band-pass filter 28 and the phase-locked loop 29, the clock signal of the angular frequency $w_c$ corresponding to the clock synchronization structure and derived from the signal supplied the photodiode 27 is applied to point 31. The clock signal controls a frequency synthesizing circuit 63, for example a frequency divider or an oscillator locked to said clock signal, which supplies a signal of a frequency corresponding to the angular frequency $w_c$ of the tracking wobble or said difference frequency $\Delta_w$. The band-pass filter 64, which is tuned to the angular frequency $w_w$ or $\Delta_w$, extracts a component whose amplitude varies with the distance to the centre line of the track 4, and is demodulated with the synchronous detector 65 by means of the signal supplied by the frequency synthesizing circuit 63. Via a low-pass filter 60 a signal appears on an output 67, which signal is representative of the tracking error. For correct operation, a correct phase relationship between the synthesized signal and the wobble frequency or said difference frequency is essential. One way to achieve this is to synchronize the track wobble with the information in said synchronization areas 8. The frequency synthesizing circuit 63 can then be synchronized with said information, for example if the circuit 63 is a frequency divider, by resetting the bistable elements include in said divider on command of said information. For this purpose the frequency synthesizing circuit 63 is coupled to the read circuit 30 in the arrangement of FIG. 5.

Another method to obtain the correct phase relationship is to include a controllable phase shifter 68 after the frequency synthesizing circuit 63. A control signal for the phase shifter may, for example, be obtained by utilizing the fact that the amplitude of the tracking signal appearing on output 67 exhibits a maximum amplitude when the phase relationship is correct. For this purpose a control circuit 71 is arranged between output 67 and phase shifter 68. In the arrangement of FIG. 5 use is made of a single photodiode 27. As is known from inter alia U.S. patent application Ser. No. 134,392 it is advantageous to employ a photodiode 27, which is divided into four sectors a, b, c and d along a tangential and a radial line, the terms tangential and radial referring to the record carrier.

FIG. 6 shows a part of the circuit arrangement of FIG. 5 to be modified when such a photodiode 27 is used. By means of an amplifier 72 the difference is determined between the sum of the signals from sectors a and b and the sum of the signals from sectors c and d. Thus, point 69 receives a signal which is proportional to the difference between the signals supplied by the sectors of the photodiode 27 located on both sides of a radial dividing line. Said signal is highly susceptible to variations of the track 4 in a tangential direction, that is to the clock signal. By means of amplifier 71 the sum of the signals supplied by the four sectors a, b, c and d is determined and fed to point 70 and to the read circuit 30. Furthermore, there may be provided an amplifier 73 for supplying the difference of the signals produced by the sectors (a+c) and (b+d) disposed on both sides of a tangential dividing line, which difference signal is very sensitive to variations in the radial direction of the track 4 and may inter alia provide an indication of the polarity of the tracking error, for example in order to determine the correct polarity of the tracking signal on output 67 when the phase correction by means of the phase shifter 68 and the control circuit 71 is used, which is necessary because the phase relationship may exhibit an error of 180° without polarity indication.

What is claimed is:

1. In an apparatus for recording and/or reading digitally coded information of a fixed bit frequency on a record carrier comprising a disc-shaped substrate provided with a radiation-sensitive layer and a plurality of generally circular track portions arranged in a spiral or concentric track pattern, said track portions having a first periodic track modulation for generating a clock signal for synchronizing read-out or recording of said digitally coded information, said first track modulation having a first period corresponding to a frequency at which the power spectrum of the digitally coded information is at a substantially zero level, said track portions further having a second periodic track modulation in the radial direction of a second period superimposed on said first track modulation for generating a tracking signal, said apparatus including means for projecting a beam of radiation onto said record carrier, means for producing relative movement between said beam and said record carrier so that said beam scans a given track portion and the radiation of said beam is modulated by said first track modulation with a first frequency corresponding to said first period at the scanning speed and is modulated by said second track modulation with a second frequency corresponding to said second period at the scanning speed, means for detecting radiation modulated by the record carrier, said detecting means supplying an electrical read-out signal having a first and second frequency component corresponding to said first and second frequency respectively, means for generating said tracking signal and means responsive to said tracking signal for maintaining said beam centered on the track portion being scanned, the improvement wherein said means for generating said tracking signal includes first means for deriving, from said read-out signal, a first signal having a frequency equal to said first frequency, second means for deriving, from said read-out signal, a second signal having a frequency which is dependent on said second frequency, a frequency synthesizing circuit synchronized by said first signal for generating, independently of said second signal, a third signal of a frequency equal to said second frequency, and a synchronous detection circuit for mixing said second signal with said third signal so as to obtain said radial tracking signal.

2. The apparatus according to claim 1 including a read circuit coupled to said detecting means for generating an information signal representative of said digitally coded information read from the record carrier and a synchronizing circuit controlled by said read circuit for synchronizing said frequency synthesizing circuit with the information read from the record carrier so as to ensure a correct phase relationship between said third signal and said second signal.

3. The apparatus according to claim 1 including a controllable phase shifter for correcting the phase relationship between said second and third signals.

4. The apparatus according to claim 3 including means for controlling said phase shiter such that the amplitude of said tracking signal is a maximum.

5. The apparatus according to claim 1, 2, 3, or 4 wherein said frequency of said second signal is equal to said second frequency.

6. The apparatus according to claim 5 wherein said second deriving means including a band-pass filter tuned to said second frequency.

7. The apparatus according to claim 1, 2, 3, or 4 wherein said frequency of said second signal is equal to the difference between said first frequency and said second frequency.

8. The apparatus according to claim 1 wherein said first deriving means includes a band-pass filter tuned to said first frequency.

* * * * *